United States Patent [19]

Lonn

[11] Patent Number: 5,241,576
[45] Date of Patent: Aug. 31, 1993

[54] SEGMENTED DETECTOR CONTAINING SUB-ELEMENTS FOR SEPARATE MEASURING OF A FAN BEAM

[75] Inventor: Albert H. R. Lonn, St. Albans, Great Britain

[73] Assignee: General Electric Company, Milwaukee, Wis.

[21] Appl. No.: 813,222

[22] Filed: Dec. 23, 1991

[51] Int. Cl.⁵ .............................................. G06F 15/00
[52] U.S. Cl. ................................. 378/19; 378/4; 378/901; 250/370.09; 250/363.02; 364/413.19; 364/413.14
[58] Field of Search ................. 378/4, 17–20, 378/901; 250/385.1, 363.02, 370.09; 364/413.13, 413.14, 413.19

[56] References Cited

U.S. PATENT DOCUMENTS

| | | | |
|---|---|---|---|
| 4,138,721 | 2/1979 | Boyd | 250/363.02 |
| 4,494,141 | 1/1985 | Altekruse | 378/19 |
| 4,504,962 | 3/1985 | Moore | 378/19 |
| 4,550,371 | 10/1985 | Glover et al. | 378/19 |
| 4,583,240 | 4/1986 | Gatten et al. | 378/19 |
| 4,747,117 | 5/1988 | Albrecht et al. | 378/19 |
| 4,787,098 | 11/1988 | Silver | 378/18 |
| 4,841,553 | 6/1989 | Nagai | 378/19 |
| 4,965,726 | 10/1990 | Heuscher et al. | 250/370.09 |
| 5,012,498 | 4/1991 | Cuzin et al. | 378/4 |
| 5,025,463 | 6/1991 | Saito et al. | 378/19 |

Primary Examiner—Paul M. Dzierzynski
Assistant Examiner—Kim-Kwok Chu
Attorney, Agent, or Firm—Quarles & Brady

[57] ABSTRACT

An x-ray CT system includes an array of detector elements which measure the attenuation values of a fan beam. Each detector element is comprised of a set of sub-elements disposed in the slice thickness direction. Attenuation signals from the sub-elements are separately preprocessed and summed together to measure the selected slice thickness and avoid partial volume artifacts in the reconstructed image.

5 Claims, 5 Drawing Sheets

FIG.3
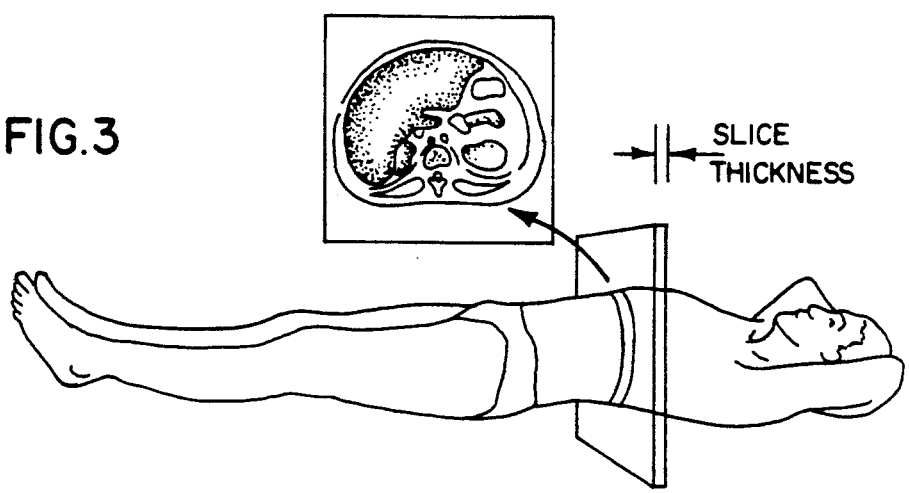
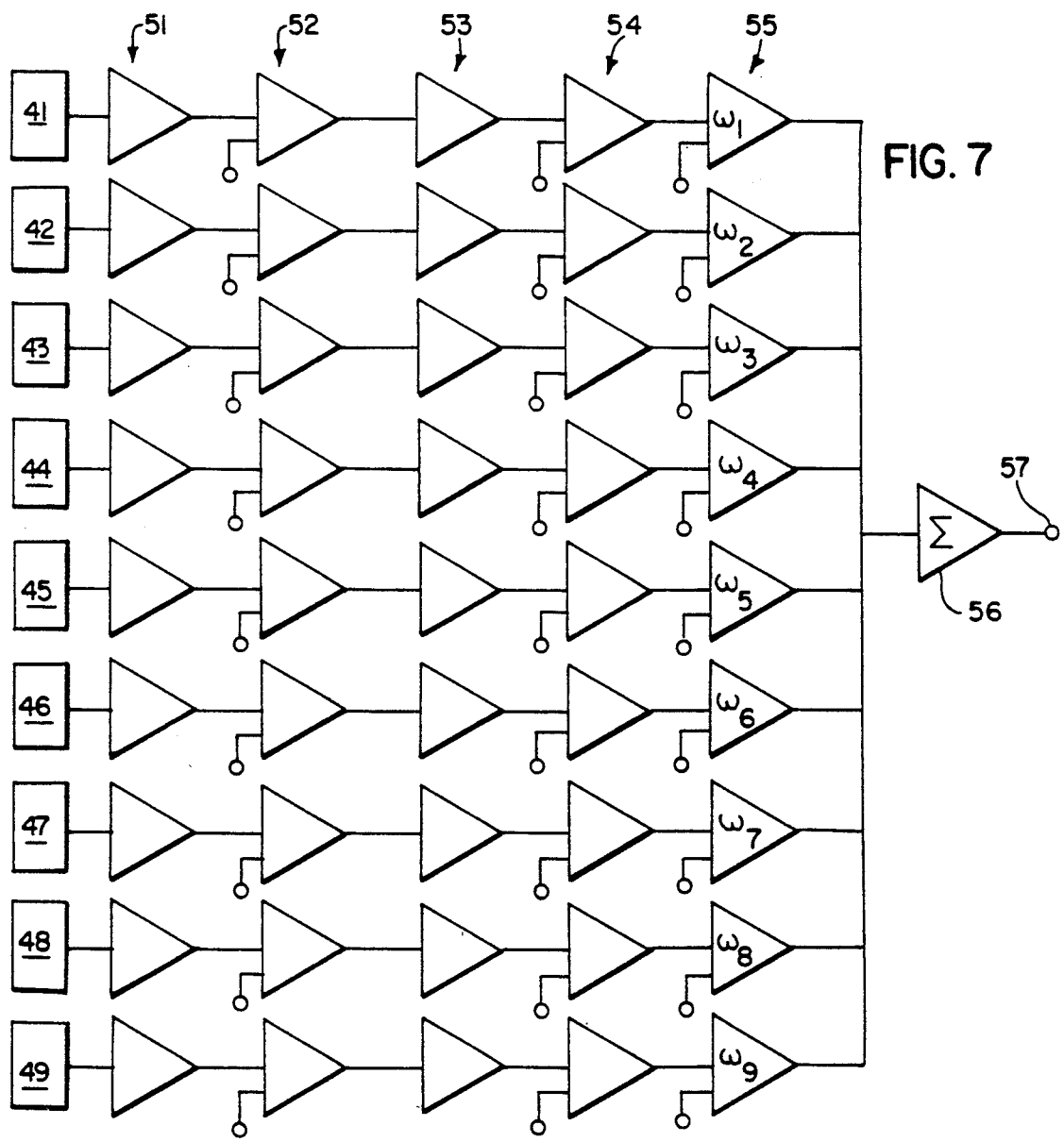
FIG. 7

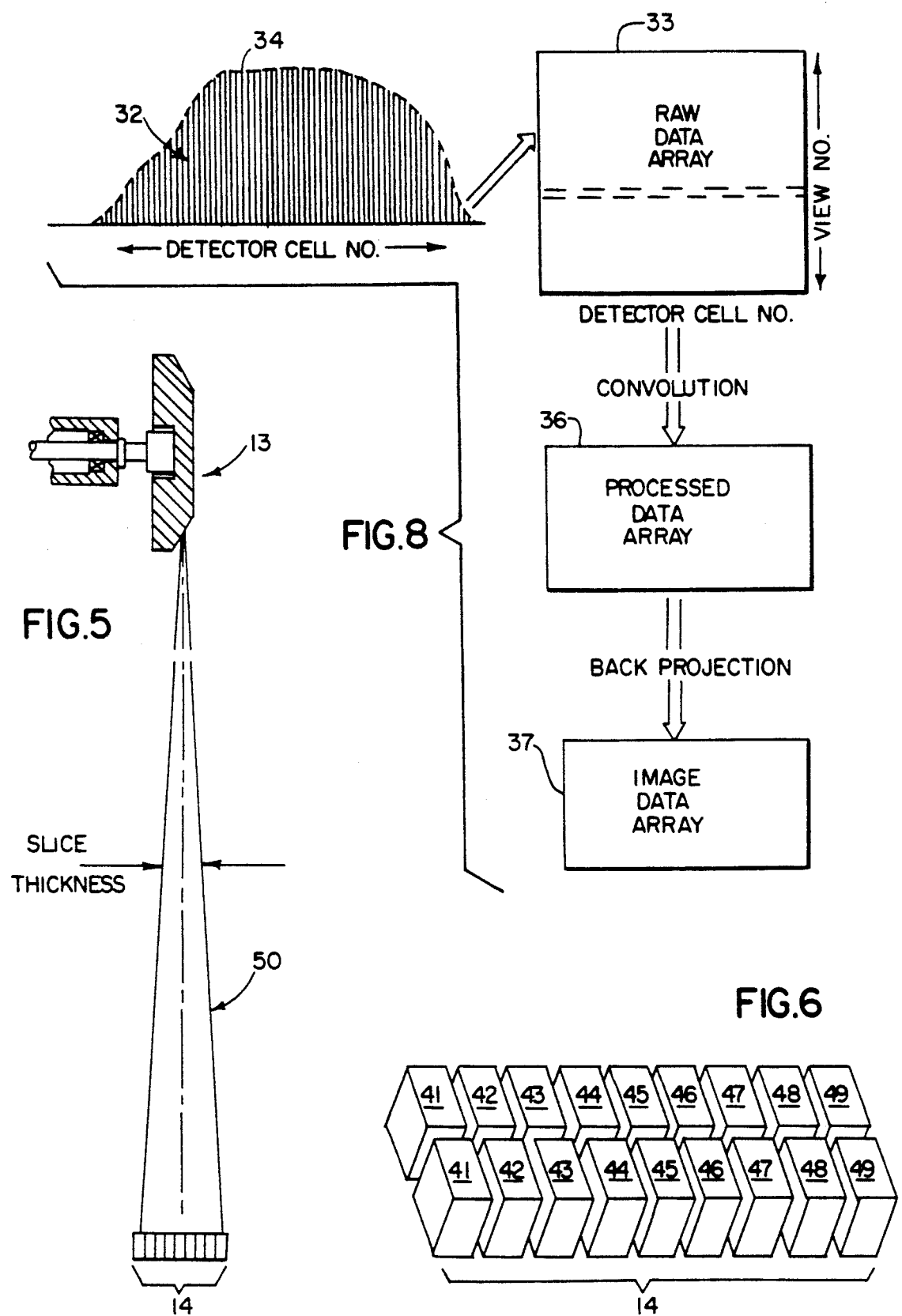

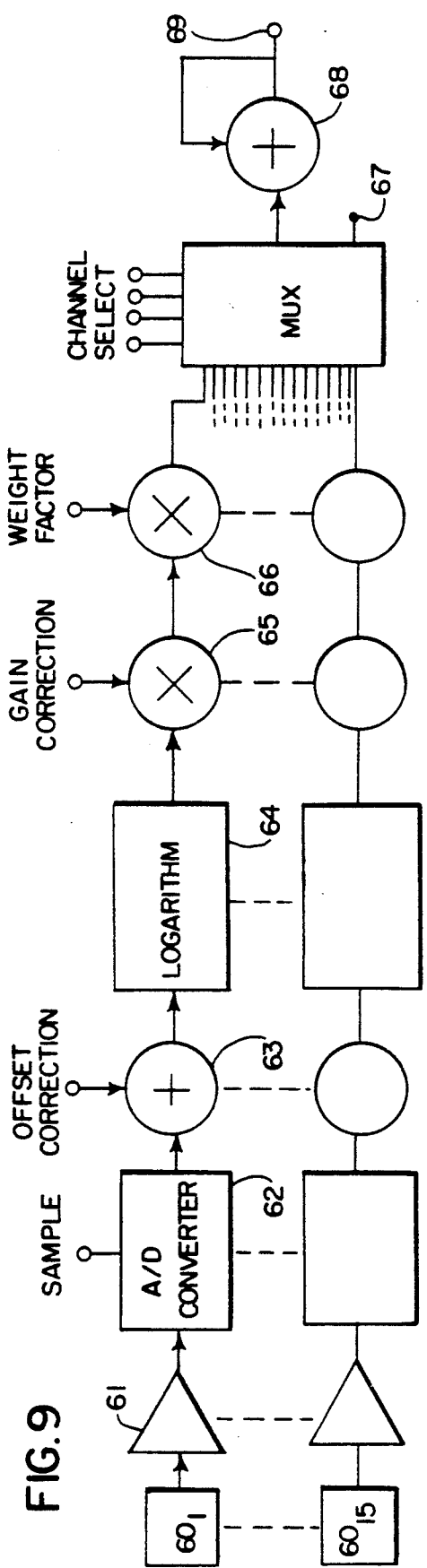
FIG. 9
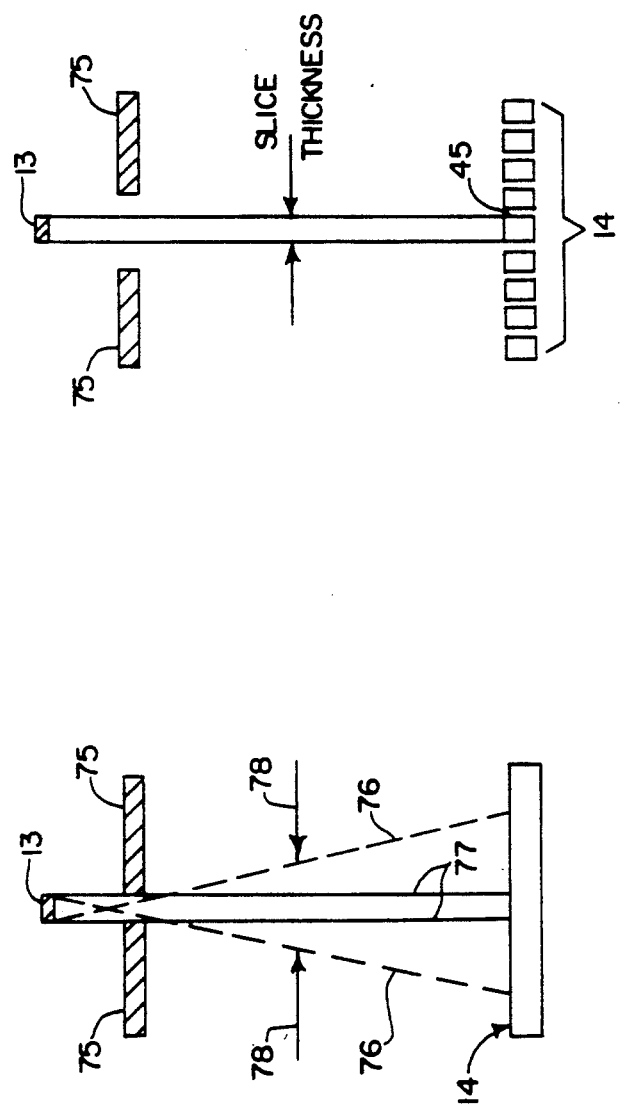
FIG. 10a
FIG. 10b

SEGMENTED DETECTOR CONTAINING SUB-ELEMENTS FOR SEPARATE MEASURING OF A FAN BEAM

BACKGROUND OF THE INVENTION

The field of the present invention is computed tomography and, particularly, computer tomography (CT) scanners used to produce medical images from x-ray attenuation measurements.

As shown in FIG. 1, a CT scanner used to produce images of the human anatomy has a patient table 10 which can be positioned within the aperture 11 of a gantry 12. A source of highly collimated x-rays 13 is mounted within the gantry 12 to one side of its aperture 11, and one or more detectors 14 are mounted to the other side of the aperture. The x-ray source 13 and detectors 14 are revolved about the aperture 11 during a scan of the patient to obtain x-ray attenuation measurements from many different angles through a range of at least 180° of revolution.

A complete scan of the patient is comprised of a set of x-ray attenuation measurements which are made at discrete angular orientations of the x-ray source 13 and detector 14. Each such set of measurments is referred to in the art as a "view" and the results of each such set of measurements is a transmission profile. As shown in FIG. 2A, the set of measurements in each view may be obtained by simultaneously translating the x-ray source 13 and detector 14 across the acquisition field of view, as indicated by arrows 15. As the devices 13 and 14 are translated, a series of x-ray attenuation measurements are made through the patient and the resulting set of data provides a transmission profile at one angular orientation. The angular orientation of the devices 13 and 14 is then changed (for example, 1°) and another view is acquired. An alternative structure for acquiring each transmission profile is shown in FIG. 2B. In this construction, the x-ray source 13 produces a fan-shaped beam which passes through the patient and impinges on an array of detectors 14. Each detector 14 in this array produces a separate attenuation signal and the signals from all the detectors 14 are separately acquired to produce the transmission profile for the indicated angular orientation. As in the first structure, the x-ray source 13 and detector array 14 are then revolved to a different angular orientation and the next transmission profile is acquired.

As the data is acquired for each transmission profile, the signals are filtered, corrected, converted to logarithmic form and digitized for storage in a computer memory. These steps are referred to in the art collectively as "preprocessing" and they may be performed in real time as the data is being acquired. The acquired transmission profiles are then used to reconstruct an image which indicates the x-ray attenuation coefficient of each voxel in the reconstruction field of view. These attenuation coefficients are converted to integers called "CT numbers," which are used to control the brightness of a corresponding pixel on a CRT display. As illustrated in FIG. 3, an image which reveals the anatomical structures in a slice 15 taken through the patient is thus produced.

In clinical applications the thickness of the slice 15 taken through the patient may be varied from very thin (1 mm) to very thick (10 mm). The slice thickness is typically controlled by an adjustable collimation device which is positioned between the patient and the x-ray source. One such collimation device is described in U.S. Pat. No. 4,991,189 which is owned by the assignee of the present invention.

As the thickness of the slice 15 is increased, the reconstructed image becomes more susceptible to partial volume artifacts. The CT number at each image pixel represents the attenuation of the x-ray beam by the corresponding voxel in the patient. For infinitesimal thin beams, an accurate measurement of the integral attenuation along the x-ray beam could be made, if sufficient flux can be detected, so that the CT number does reflect a true average attenuation of all material in the corresponding patient voxel. However, for x-ray beams having a finite thickness, and where the attenuation of the material is inhomogeneous in the thickness direction, an accurate measurement of the average attenuation across the beam is not achieved. This inaccuracy is pronounced, for example, in patient voxels which contain a boundary between highly attenuating material such as bone and soft tissues. Because of the nature of the image reconstruction process, this inaccuracy not only affects the corresponding image pixel, but also surrounding pixels. This results in image artifacts which interfere with the diagnosis of soft tissue features.

There are two known techniques for dealing with this partial volume artifact problem when imaging thick slices. First, attempts have been made to predict the distribution of bone in a slice using data acquired from neighboring slices. Such predictions can be used to correct the data, however, in practice the inter slice spacing between slices is too large to provide accurate predictions. The second approach is to acquire the thick slice as a series of separate, but contiguous thin slices. As the slice is made thinner, the flux of x-rays intercepted by the detector is reduced. This results in a noisier image, and for large patients, the detected signal may fall below the noise level of the detector and no image can be reconstructed. In this case it is necessary to increase the x-ray tube flux, or increase the integral time for the detected signal. While this works, the time required for data acquisition and data processing is multiplied by the number of thin slices required. In addition, x-ray tube cooling rate and heat capacity may further lengthen the scan time, and patient movement during the longer scan may corrupt the acquired data. As a result, it is not practical to scan larger volumes with thin slices because of the long time involved in scanning the patient, reconstructing the images and waiting for the x-ray tube to cool, and the higher x-ray dose to the patient.

SUMMARY OF THE INVENTION

The present invention is an x-ray CT scanner which can produce images from thick slices of attenuation data with reduced partial volume artifacts. More specifically, the present invention is an x-ray CT scanner in which each x-ray detector element is comprised of a set of detector sub-elements which are disposed along the slice thickness direction and which each produce a thin slice attenuation signal; a preprocessor having separate channels for each thin slice attenuation signal; summing means for producing a thick slice attenuation signal from the preprocessed thin slice attenuation signals; and image reconstruction means for producing an image from the thick slice attenuation signals.

A general object of the invention is to produce a thick slice image with reduced partial volume artifacts. It has been discovered that by simultaneously acquiring the attenuation data as a set of contiguous thin slices and preprocessing that data separately through the calculation of the logarithm of the attenuation data, that more accurate attenuation data is acquired across the thick slice. This results in reduced image artifacts.

Another object of the invention is to produce improved thick slice images without increasing the data processing time. The preprocessing may be performed in real time by parallel circuits. The separate thin slice attenuation signals are also summed into a single thick slice attenuation signal in real time. The image reconstruction process need only be performed once on the thick slice attenuation data, with the result that the image processing time is the same as with thin slice imaging.

Yet another object of the invention is to produce a thick slice image without a reduction in the signal-to-noise ratio (SNR).

A more specific object of the invention is to enable the slice of attenuation values to be contoured along the thickness direction. This is achieved by weighting each preprocessor sub-channel with a weight ($w=0$ to 1), such that each thin slice attenuation signal makes a weighted contribution to the summed thick slice attenuation signal. As a result, slice thickness is easily controlled by blocking the signal from some sub-elements ($w=0$), or the signals from peripheral sub-elements are attenuated ($w<1$) relative to the signals from central sub-elements ($w=1$).

Yet another object of the invention is to produce a plurality of images from data acquired during a single scan. The thin slice attenuation signals may be separately summed together to form a plurality of thick slice attenuation signals. For example, eight 1 mm thin slice attenuation signals may be separately summed to form two 4 mm thick slice attenuation signals that are employed to reconstruct two separate images.

Yet another object of the invention is to acquire thick slice images without increased motion artifacts. Because the attenuation data for the thick slice is acquired over the same time interval as that for a conventional thin slice, artifacts due to intervening patient motion will be the same.

The foregoing and other objects and advantages of the invention will appear from the following description in which reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 3 is a pictorial view of a patient showing a typical image reconstructed from a slice of attenuation acquired with the system of FIG. 1;

FIG. 5 is a schematic representation of the x-ray beam path showing its thickness;

FIG. 6 is a partial perspective view of a portion of the detectors used in the system of FIG. 1 showing the detector sub-elements disposed in the slice thickness direction;

FIG. 7 is an electrical block diagram of a first preferred embodiment of the preprocessor which forms part of the data acquisition system in FIG. 5;

FIG. 8 is a schematic representation of the attenuation data acquired with the system of FIG. 4 and the image reconstruction process;

FIG. 9 is an electrical block diagram of a second preferred embodiment of the preprocessor which forms part of the data acquisition system in FIG. 5; and FIGS. 10A and 10B are schematic representations of the x-ray beam path illustrating how beam thickness is defined in a conventional system and in a system that employs the present invention respectively.

DESCRIPTION OF THE PREFERRED EMBODIMENT

Figure 1:
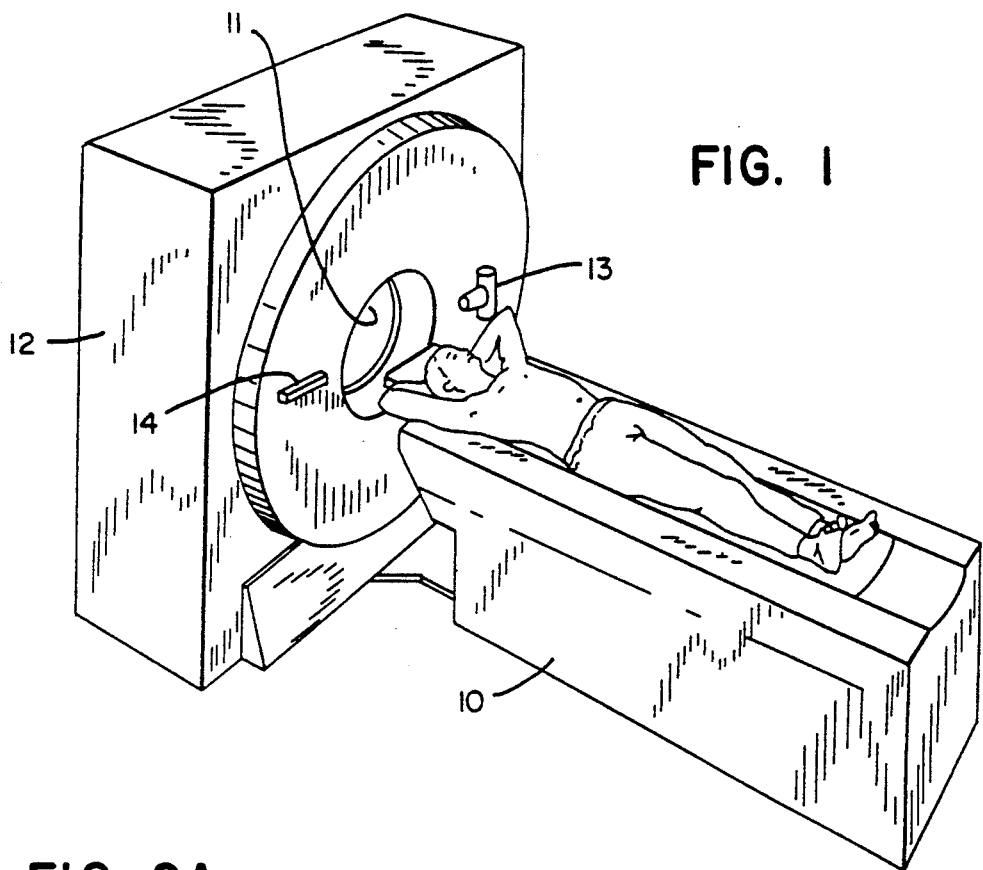
FIG. 1 is a perspective view of a CT system which employs the present invention.
Figure 2A:
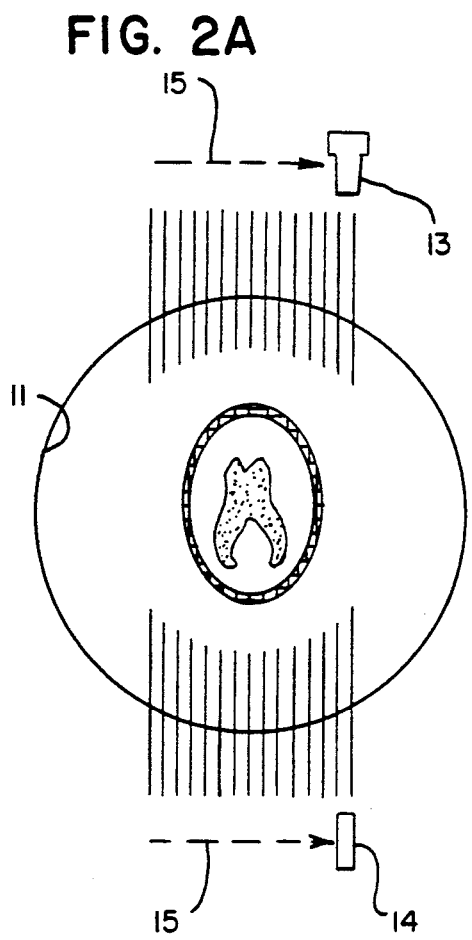
FIGS. 2a and 2b are schematic representations of two types of scanning techniques which may be employed in the CT system of FIG. 1.
Figure 2B:
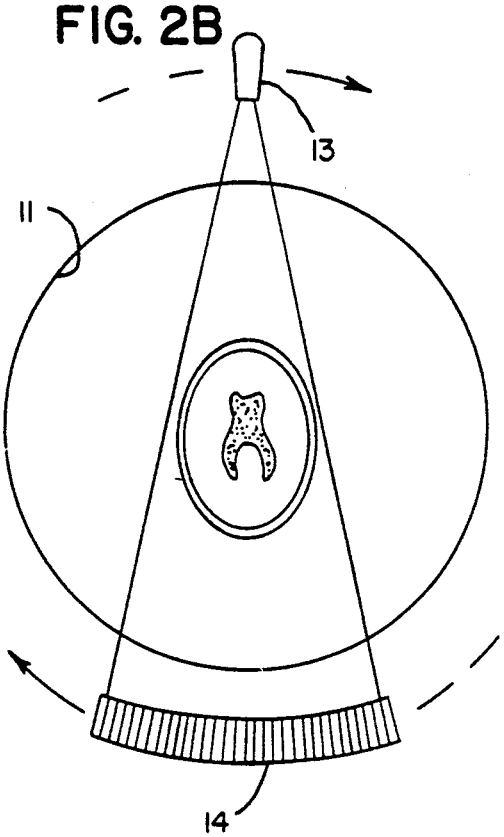
Figure 4:
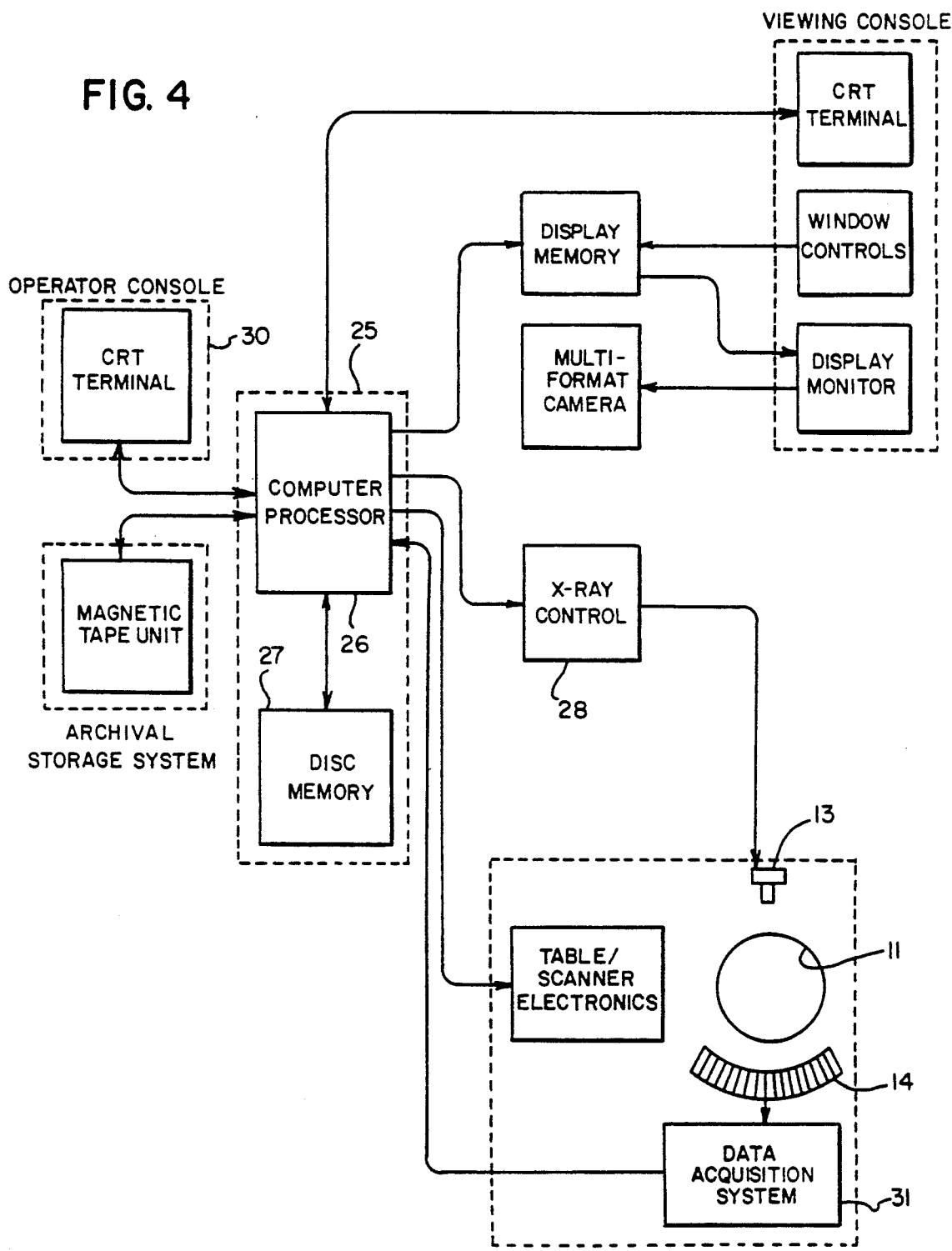
FIG. 4 is a block diagram of the CT system of FIG. 1.

Referring particularly to FIG. 4, the operation of the CT system is controlled by a programmed data processing system 25 which includes a computer processor 26 and a disc memory 27. The disc memory 27 stores the programs the computer processor 26 uses in patient scanning and in image reconstruction and display. It may also store on a shortterm basis the acquired data and the reconstructed image data. The computer processor 26 includes a general purpose minicomputer with input and output ports suitable for connection to the other system elements as shown. It also includes an array processor such as that disclosed in U.S. Pat. No. 4,494,141.

An output port on the computer processor 26 connects to an x-ray control circuit 28, which in turn controls the x-ray tube 13. The high voltage on the x-ray tube 13 is controlled and its cathode current is controlled to provide the correct dosage. The high voltage and cathode current are selected by an operator who enters the desired values together with the scan time and other scan parameters through an operator console 30. The computer processor 26 directs the production of the x-rays in accordance with its scan program and these scan parameters.

The x-rays are dispersed in a fan-shape as described above and received by the array of detectors 14 mounted on the opposite side of the gantry aperture 11. As will be described in more detail below, in the preferred embodiment there are 852 individual cells, or detector elements, and each examines a single ray originating from the x-ray tube 13 and traversing a straight line path through a patient located in the aperture 11. The detector array 14 also includes a group of reference cells at each of its ends that receive unattenuated x-rays from the source 13. The currents formed in each detector element are collected as an analog electrical signal and converted into a digital number by A/D converters in a data acquisition system 31. The digitized measurements from all the detectors is a complete view. U.S. Pat. Nos. 4,112,303 and 4,115,695 disclose details of the gantry construction, and the data acquisition system is disclosed in U.S. Pat. No. 4,583,240. The digitized signals are input to the computer processor 26. It can be appreciated that a different number of detector cells can be employed to cover a smaller or larger field of view.

The digitized attenuation measurements from the data acquisition system 31 are preprocessed in a well known manner to compensate for "dark currents", for uneven detector cell sensitivities and gains, and for variations in x-ray beam intensity throughout the scan. This is followed by beam hardening corrections and conversion of the data to logarithmic form so that each measured value represents a line integral of the x-ray beam attenuation. This preprocessing may be performed in real time as the scan is being conducted, or the detector signals may be filtered, digitized and stored for preprocessing at the completion of the scan. As shown in FIG. 8, the resulting attenuation values 32 in each view are stored on one row of a two-dimensional raw data array 33. As indicated by the dashed line 34, each such row of attenuation data provides a transmission profile of the object to be imaged when viewed from a single angle.

Referring still to FIG. 8, at the completion of the scan, the raw data array 33 stores on each of its rows a transmission profile 34 from one view. One dimension of this array 33 is, therefore, determined by the number of views which are acquired in the scan and the other dimension is determined by the number of detector cell signals which are acquired during each view. The number of detector cell signals which are acquired determine the acquired field view. In the preferred embodiment, this may include up to 852 detector cell signals.

Before reconstructing an image from the attenuation values in the raw data array 33, the data is filtered using a convolution kernel function as is well known in the art. Filtering the data before the transmission profile is subsequently back projected to reconstruct the image eliminates blurring around each point. This convolution step is very computationally intensive since it involves the multiplication of attenuation values around each element in the raw data array 33 by the values of a convolution kernel, and adding the results together to form a processed data array 36. The method commonly used to perform this function is to Fourier transform each row of the raw data array 33, Fourier transform the convolution kernel, and multiply the two transformed waveforms together. An inverse Fourier transformation is then performed to produce the processed data array 36. An image data array 37 is then produced by performing a conventional back projection of the filtered data and this is used to control the pixel brightness in the reconstructed image.

Referring to FIGS. 5 and 6, unlike prior CT systems, the attenuation signal produced by each element of the detector array 14 in the preferred embodiment is composed of thin slice attenuation signals which are derived from attenuation measurements made by nine separate detector sub-elements 41-49. The sub-elements 41-49 are disposed along the slice thickness direction, and each receives a thin portion of the x-ray beam 50 which is produced by the x-ray source 13. The sub-elements 41-49 are disposed as close as possible to one another so that the thin slices which they measure are contiguous. As will be explained in more detail below, the separate thin slice attenuation signals produced by the sub-elements 41-49 are separately preprocessed in the data acquisition system 31 (FIG. 4) and are summed together to produce the detector attenuation values 32 discussed above (FIG. 8).

The x-ray beam is attenuated by an amount equal to the line integral of all the attenuations in its path S. If the intensity of a mono-energetic x-ray beam without a patient in position is $I_0$, the signal reaching the detector sub-element is attenuated by all the material traversed by the beam along its path:

$$I = I_0 e - \int \mu_s ds \quad (1)$$

If we measure the intensity without the patient (air calibration scan) and then measure the intensity with the patient, we can take the natural log of the ratio and find the total attenuation:

$$\ln(I/I_0) = \int \mu_s ds \quad (2)$$

If the detector 14 is split into M sub-elements in the slice thickness direction z, where the sub-element size is small enough so that there is no significant variation in attenuation, the attenuation signal from each sub-element is given by:

$$I_z = I_{0z} e - \int \mu_{sz} d_{sz} \quad (3)$$

where the integral represents a line integral along a path between the x-ray source 13 and the detector sub-element.

If the measured signal from each sub-element is processed by applying offset correction, taking its log, performing gain correction and summing with weights $w_1 \ldots w_M$, the resulting thick slice attenuation signal is given by:

$$R = \sum_{z=1}^{z=M} w_z \ln(I_{0z}) - \sum_{z=1}^{z=M} w_z \int \mu_{sz} ds \quad (4)$$

The first term represents the weighted sum of the beam intensity over the sub-elements and this can be eliminated by a prior measurement of the beam intensity without the patient. The second term represents a weighted sum over the line integrals of attenuation along the beam paths to the various sub-elements. The image reconstructed from these thick slice attenuation readings will have picture elements with average attenuation in each element according to the weighted sum of the attenuation in each sub-element.

One embodiment of the preprocessor employed to practice the present invention is shown in FIG. 7. The thin slice signal produced by each sub-element 41-49 is first filtered in the conventional manner by a filter 51 and is then corrected for offset variations in a preamplifier circuit 52. The corrected thin slice signal is then converted to logarithmic form by a circuit 53, and it is then gain corrected in an amplifier circuit 54. The corrected and converted thin slice signals are then weighted by amplifiers 55 which are controlled by nine separate weighting signals $w_1$-$w_9$. The weighting values $w_1$-$w_9$ range from 0 to 1.

The nine separate sub-element signals produced at the outputs of the amplifiers 55 are summed together by a summing circuit 56. The resulting output at 57 is the sum of all the thin slice attenuation values produced by the nine sub-elements 41-49 and it represents the attenuation value of the thick slice composed of the sum of the nine thin slices. This single thick slice attenuation value is digitized and processed as described above to reconstruct an image. The circuits employed in this first embodiment of the preprocessor are hybrid analog/digital circuits in which the correction values and weighting factors are applied as digital numbers to effect the analog sub-element signals.

The weighting values $w_1$-$w_9$ can be separately controlled to determine the slice thickness of the reconstructed image. Each sub-element measures a thin slice of 1 millimeter and anywhere from 1 to 9 of these can be combined by setting the weighting values for the remaining sub-elements to zero. In addition, the weighting factors $w_1-w_9$ can be varied across the measured thick slice to provide any desired contour.

A second embodiment of the preprocessor employed to carry out the present invention is illustrated in FIG. 9. In this embodiment, fifteen sub-elements $60_1-60_{15}$ are employed in the detector 14, with each sub-element measuring a thin slice of 1 mm in thickness. Each sub-element $60_1-60_{15}$ produces an input signal to one of fifteen identical preprocessor channels. Only one of these preprocessor channels is shown completely in FIG. 9, and it should be understood that the remaining channels are the same.

The sub-element signal is applied to a filter 61 as described above, but then it is digitized by an A/D converter 62 in response to a periodic sample signal from the data processing system 25 (FIG. 4). The digitized thin slice signal is then corrected for offset in a digital summing circuit 63 and converted to logarithmic form in a logarithm look-up table PROM 64. The resulting thin slice attenuation signal is corrected for detector gain variations in a digital multiplier 65 and is weighted as described above in a digital multiplier 66. It should be apparent to those skilled in the art that the gain correction and weighting factor can also be combined into a single digital number and applied to a single digital multiplier rather than the two separate multipliers 65 and 66. In either case, the fifteen separate thin slice attenuation values are applied to a multiplexer circuit 67 which is responsive to a 4-bit channel select code from the data processing system 25 to output one channel to a digital adder 68. The channel select code is driven through a series of values to selectively scan the separate thin slice attenuation values and sum them together as will be described below. The summed attenuation values appear at output 69 which is applied to the data processing system 25 and employed to reconstruct an image as described above.

Under program control, the preprocessor of FIG. 9 may be operated to produce one or more slices of attenuation data ranging in the thickness from 1 to 15 millimeters. For example, the thin slice attenuation signals for the respective detector segments $60_1-60_5$, $60_6-60_{10}$ and $60_{11}-60_{15}$ can be summed together to form three 5 mm thick slices, or the successive sets of three thin slice attenuation signals can be summed to form five separate 3 mm thick slices. Anywhere from one to fifteen separate transmission profiles can thus be acquired for each view during the scan, and at the completion of the scan anywhere from one to fifteen separate images can be reconstructed from the resulting raw data arrays.

It should be apparent that the detector elements can be divided into any desired number of sub-elements. Each sub-element should measure a slice of from 1 to 3 millimeters and groups of these can be combined to measure thicker slices. Regardless of the number of sub-elements, either an analog preprocessor or a digital preprocessor may be employed.

Another advantage of the segmented detector and separate preprocessor channels is illustrated in FIGS. 10A and 10B. In FIG. 10A a conventional detector element 14 receives radiation from an x-ray source 13. A pre-patient collimator 75, such as that described in U.S. Pat. No. 5,054,041 is adjusted to provide an opening for the x-rays that produces a beam of the desired thickness. However, because the focal spot on the x-ray source 13 has a finite size (e.g. 1 mm by 1 mm), the slice thickness is not sharply defined. Instead, a penumbra, indicated by dashed lines 76, is formed to each side of the desired beam thickness indicated by lines 77. As a result, the detector 14 receives x-rays that have traveled through a relatively thick slice of the patient as indicated by the arrows 78. The measurement is, therefore, affected by structures which lie outside the desired thin slice.

When the segmented detector of the present invention is used as shown in FIG. 10B, a thin slice thickness is sharply defined. If, for example, the x-ray source focal spot 13 is one millimeter in size and the detector sub-element 45 is one millimeter in size, the slice thickness is sharply defined at approximately one millimeter. No penumbra is formed since slice thickness is selected by combining the thin slice attenuation signals from the desired number of detector sub-elements rather than adjusting the opening in the pre-patient collimator 75.

I claim:

1. An x-ray CT scanner which comprises:
   means for producing an x-ray beam which passes through an aperture and has a width in the plane of an image to be produced and a thickness orthogonal to the plane of the image;
   detector means mounted to intercept the x-ray beam and including a set of detector sub-elements which are disposed along the beam thickness direction and which intercept successive portions of the x-ray beam along its thickness direction to produce a corresponding set of thin slice attenuation signals;
   preprocessor means including:
   a) logarithm means for receiving each of the thin slice attenuation signals and producing a corresponding set of logarithmic thin slice attenuation signals; and
   b) means for summing together the separate logarithmic thin slice attenuation signals to produce a single slice attenuation signal; and
   image reconstruction means for receiving the single slice attenuation signal and using it to produce an image.

2. The x-ray CT scanner as recited in claim 1 in which the x-ray beam is a fan beam and the detector means includes a plurality of detector elements disposed in the plane of the fan beam, and each detector element is comprised of a set of said detector sub-elements.

3. The x-ray CT scanner as recited in claim 2 in which there is a separate preprocessor means for each detector element and each preprocessor means produces a separate single slice attenuation signal by summing the logarithm of the separate thin slice attenuation signals produced by the detector element's sub-elements.

4. The x-ray CT scanner as recited in claim 1 in which the preprocessor means includes means for weighting the separate thin slice attenuation signals before they are summed together to form the single slice attenuation signal.

5. The x-ray CT scanner as recited in claim 1 in which the means for summing the separate logarithmic thin slice attenuation signals produces a plurality of single slice attenuation signals, and the image reconstruction means produces a corresponding plurality of images.

* * * * *